(12) United States Patent
Meyer

(10) Patent No.: US 6,792,989 B2
(45) Date of Patent: Sep. 21, 2004

(54) DEVICE FOR APPLYING A CABLE ONTO A ROTATING SURFACE

(75) Inventor: Daniel Meyer, Chamalieres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 232 days.

(21) Appl. No.: 09/995,363

(22) Filed: Nov. 27, 2001

(65) Prior Publication Data
US 2002/0062910 A1 May 30, 2002

(30) Foreign Application Priority Data
Nov. 28, 2000 (FR) .............................. 00 15461

(51) Int. Cl.[7] .......................... B29D 30/30; B29D 30/70
(52) U.S. Cl. ...................... 156/397; 156/117; 156/177; 156/440
(58) Field of Search ............... 156/133, 117, 156/177, 180, 181, 397, 405.1, 440

(56) References Cited
U.S. PATENT DOCUMENTS 3,526,368 A * 9/1970 Sanders .................. 242/412.1
4,874,455 A 10/1989 Ginter
5,863,368 A 1/1999 Perrin \* cited by examiner Primary Examiner—Geoffrey L. Knable
(74) Attorney, Agent, or Firm—Martin Farrell; E. Martin Remick; Felipe J. Farley

(57) ABSTRACT

The invention concerns a device for the application (1) of at least one cable onto a rotating receiving surface (2) revolving at a speed V2, comprising means (10) for feeding the cable that comprise at least one capstan (11) revolving at a speed V1, means (20, 30) to displace the cable transversely relative to the receiving surface (2) and means (40) to position the cable on said receiving surface, characterized in that the means (20, 30) to displace the cable transversely effect said displacement by the combination of a rotary movement about an axis perpendicular to the cable travel direction with a pivoting movement in a plane containing the axis of said rotation, the extent of pivoting being determined by the ratio between the speeds V1 and V2.

8 Claims, 4 Drawing Sheets

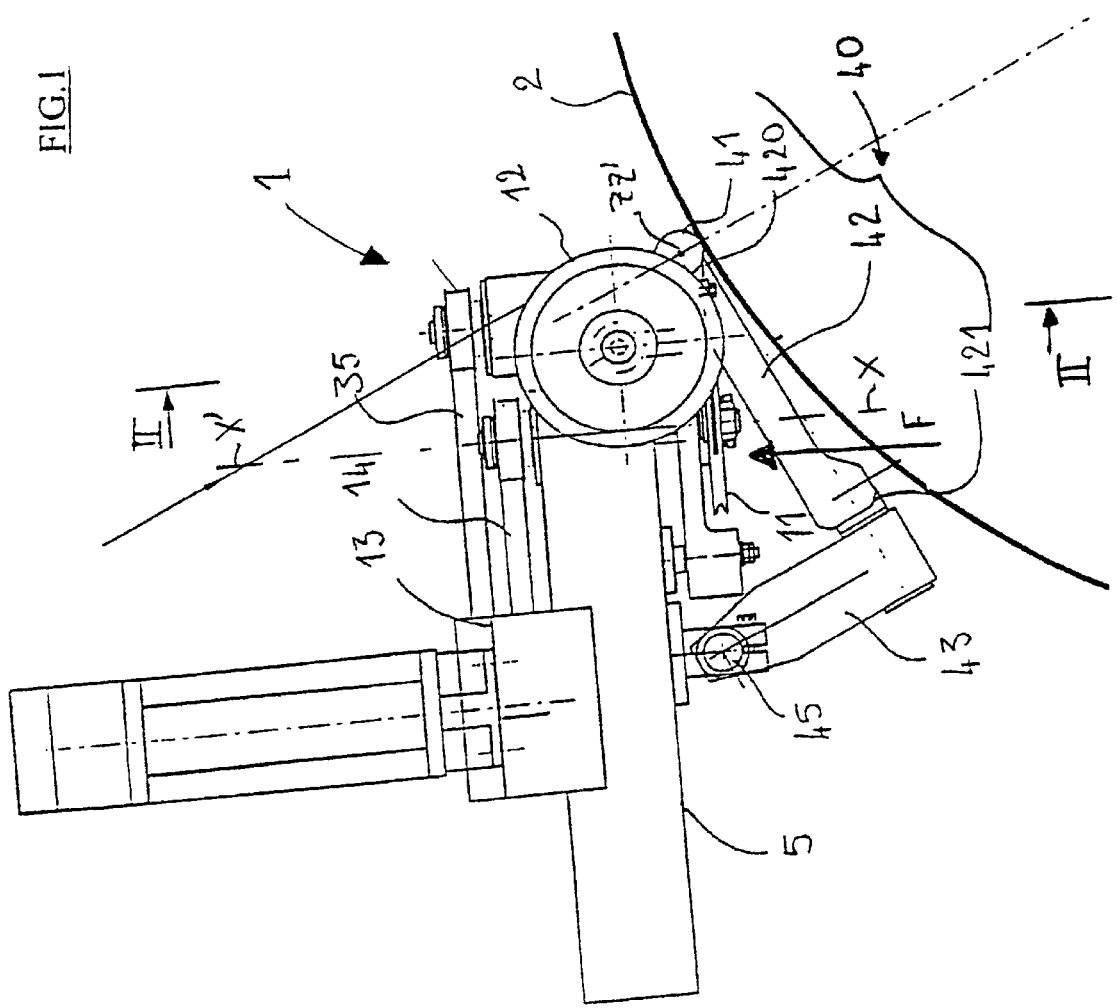

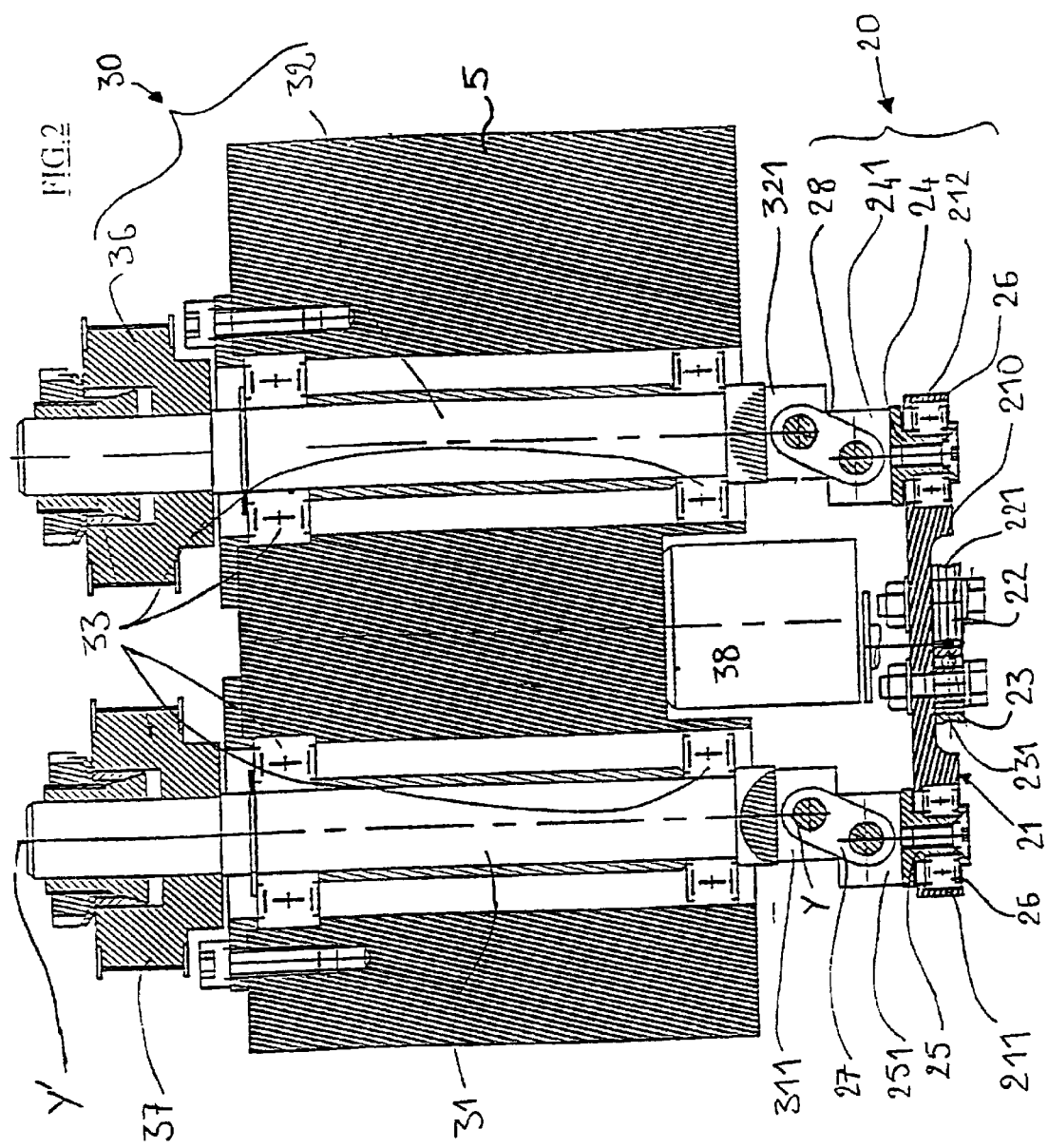

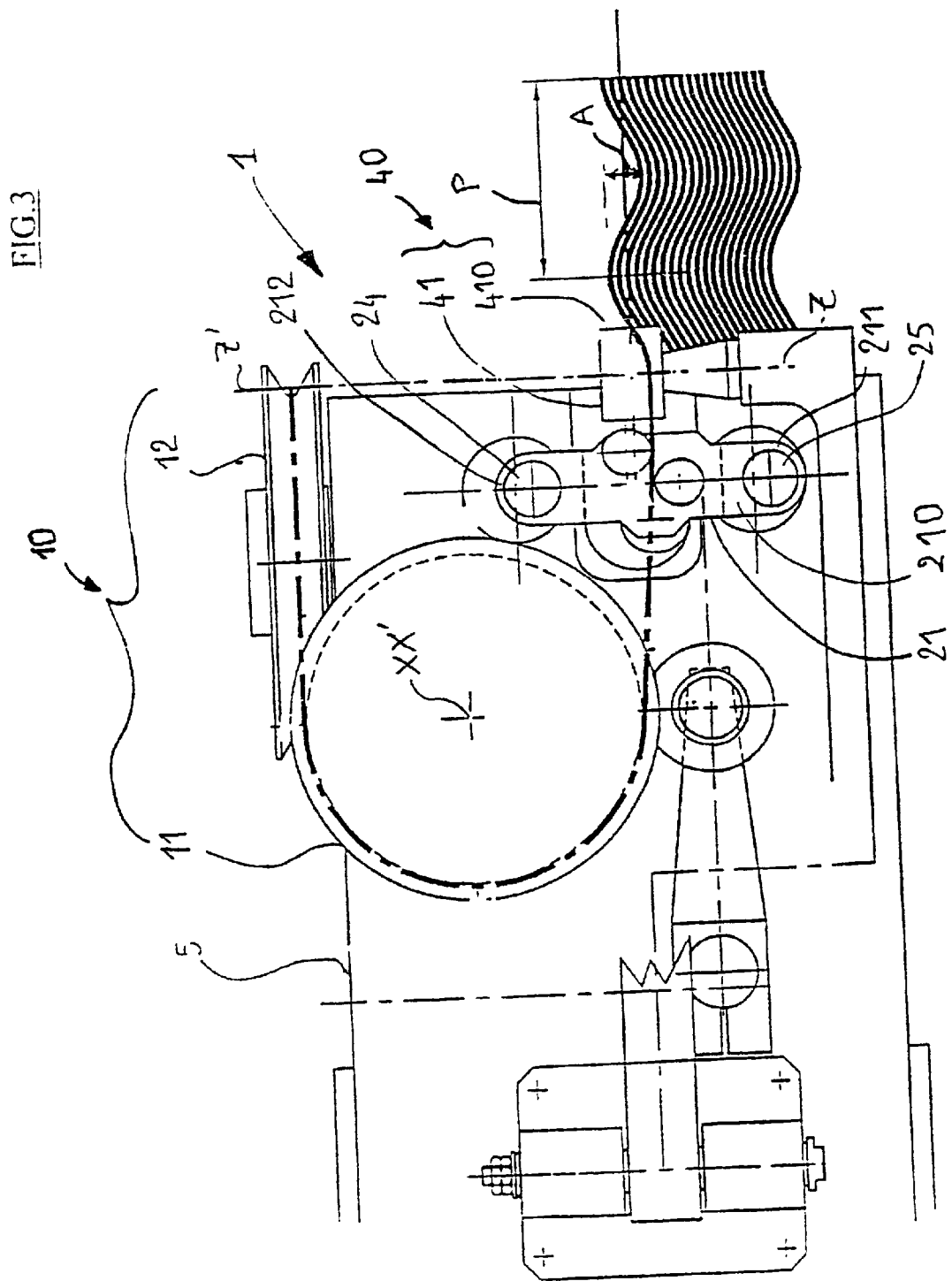

DEVICE FOR APPLYING A CABLE ONTO A ROTATING SURFACE

BACKGROUND AND SUMMARY OF THE INVENTION

The invention concerns a device for applying a cable onto a rotating receiving surface, in particular for the manufacture of tires.

The benefit of incorporating annular reinforcement in tires, that can be used all around their circumference, such as a carcass reinforcement, was demonstrated a long time ago. Such reinforcement can in particular consist of a ply comprising cables wrapped radially on the tire carcass; this ply is currently referred to in the vulcanized tire as the "zero-degree ply."

Here, the term 'cable' means one or more textile or metallic cords; said cord or cords, moreover, can be coated with a raw or cured rubber mixture.

Metallic cords in particular are used to make the zero-degree ply in certain tires such as those designed for heavy loads. Now, during the vulcanization of the uncured tires, the tires undergo a shaping process in the vulcanization mould which must be taken into account for the final structure of the tires. It is clear that the use of metallic cables for zero-degree plies involves great difficulties, since the rigidity of these cables does not allow them to elongate during shaping in the mould.

Various solutions have been considered for overcoming this problem. One solution was to use subdivided metallic cables. Zero-degree plies made in that way can conform to the elongation to which the tire is subjected during vulcanization. Such plies, however, constitute zones in the vulcanized tire which are more susceptible to oxidation because of the cuts between the different sections of the cable. This solution is therefore unsatisfactory.

Other solutions have been proposed, which relate to the nature of the metallic cables. For example, the use of bi-elastic metal cords makes it possible to achieve a compromise between the rigidity and elongation properties of the uncured ply obtained. Although interesting, such a solution entails considerable modifications in the desired uncured and vulcanized structures of the tires, to compensate for the lower rigidity of the vulcanized zero-degree ply obtained, such as the presence of an additional ply, modifications of the rubber mixtures, etc.

Finally, a third approach was to modify the positioning of unvulcanized products so as to obtain desired structures after vulcanization. This led to the idea of positioning the cables in an undulating shape in the unvulcanized tire, so that they will be arranged radially in the vulcanized tire by virtue of the shaping that takes place in the vulcanization mould.

This intelligent solution, however, still presents difficulties in being put into practice.

In effect, the unvulcanized tire has been built up on a cylindrical or slightly curved drum, while the vulcanized tire emerging from the vulcanizing mould is more markedly curved compared with its initial shape. Consequently, during shaping, the deformations undergone by the tire will be much larger at the crown of said tire than at its shoulders. It is therefore necessary to be able, in an industrial operation, to position a cable sinusoidally with different undulations, or even different periods, according to its radial position so that the ply produced will have cords orientated radially whatever its radial position near the crown or the shoulders.

European Patent Publication EP-0 724 949 describes a device for applying textile or metallic cords on a rotating surface with sinusoidal undulations. Such positioning may be achieved by means designed to displace the cords in transverse translation relative to their feed direction, the amplitude and period of the sinusoid being regulated by measuring and regulating the rotation speeds of the positioning surface, the element feeding the cords, and the control of the displacement means. However, said displacement means consist of a cord feeder that can be moved in the transverse direction, actuated by a motor via a connecting rod attached to a motorized wheel.

In practice, this means that since the rotation speed of the positioning surface is fixed, to modify the undulation amplitude of the cords on that surface continuously the speed of the element feeding the cords must be varied in order to modify the quantity of cord fed in and the position of the connecting rod relative to the wheel must be varied in order to synchronize the amplitude modification of the undulations produced. It seems difficult to achieve this last modification continuously. Moreover, it is clear that as a function of the sinusoid desired, the positioning speed too must be limited so as not to disturb the motorized movement of the cord feeder.

The aim of the invention is to overcome this combination of difficulties.

According to the invention, the device for applying at least one cable onto a rotating receiving surface having a linear surface speed $V2$ comprises a body with means for feeding the cable that comprise at least one rotatable capstan producing a cable linear speed $V1$, means to displace the cable transversely relative to the receiving surface and means to position the cable on said receiving surface, characterized in that the amplitude of the transverse displacement of the means to displace the cable transversely is controlled directly as a function of the ratio between the speeds $V1$ and $V2$, and said amplitude can be modified continuously during the positioning of the cable.

Thus, said control enables continuous modification of the amplitude of the sinusoid formed, but above all it enables very high cable positioning speeds to be achieved.

The objective of the invention is accordingly a device for applying at least one cable onto a rotating receiving surface having a linear surface speed $V2$, with means to feed the cable that comprise at least one capstan revolving to produce a cable linear speed $V1$, means to displace the cable transversely relative to the receiving surface, and means to position the cable on said receiving surface, characterized in that the means to displace the cable transversely effect said displacement by the combination of a rotary movement about an axis perpendicular to the cable travel direction with a pivoting movement in a plane containing the axis of said rotation, the extent of pivoting being determined by the ratio between the speeds $V1$ and $V2$.

The invention also relates to a process for applying at least one cable onto a rotating receiving surface, in particular during the manufacture of tires, which comprises the following stages:

a cable is fed in a direction essentially perpendicular to the rotation axis of the receiving surface;

the cable is displaced transversely to said surface to produce undulations on the latter; and, the cable is positioned on said receiving surface, characterized in that the transverse displacement of the cable is obtained by the combination of a rotary movement about an axis perpendicular to the cable travel direction with a pivoting movement in a plane containing the axis of said rotation, the extent of pivoting being determined by the quantity of cable fed per revolution of the receiving surface.

BRIEF DESCRIPTION OF THE DRAWINGS

Other characteristics and advantages of the invention will emerge on reading the description of an example embodiment of a device according to the invention for applying a cable, which refers to the drawing in which:

FIG. 1 shows a schematic view of a lateral elevation of the application device according to the invention FIG. 2 shows a partial section of the application device along the line II in FIG. 1

FIG. 3 shows a partial view from below, of the application device along the arrow F in FIG. 1

DETAILED DESCRIPTION

Figure 4A:
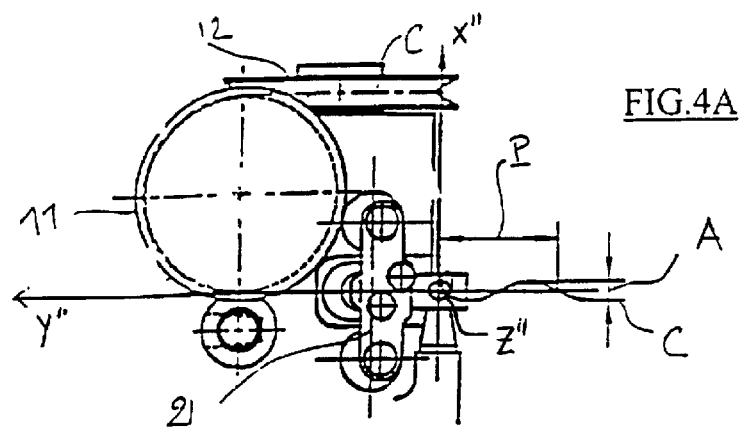
FIGS. 4A to 4D shows schematic views of the application device in FIG. 3, illustrating its different operating phases.

In FIG. 1 the device 1 for applying a cable onto a rotating receiving surface 2 comprises a body 5, the cable being applied on the receiving surface 2 in a direction essentially perpendicular to the rotation axis of said surface and tangentially to it. The rotating receiving surface 2 has a controlled linear surface speed which will be designated as V2.

In what follows, 'cable travel direction' will mean the direction essentially perpendicular to the rotation axis of the receiving surface 2.

Referring also to FIG. 2 and FIG. 3, the body 5 comprises means 10 to feed the cable in a direction perpendicular to the rotation axis of the receiving surface, means 20, 30 to displace said cable transversely, and finally, means 40 to position the cable on the receiving surface 2, these various devices acting in succession to apply the cable on the receiving surface 2 with the desired undulations.

The feeding means 10 comprise at least one cable infeed pulley 12 supplied from a supply reel (not shown). The rotation axis of the pulley 12 is in this case parallel to that of the receiving surface 2. This allows the supply reel easily to supply a capstan 11 whose axis XX' is perpendicular to that of the roller 12. Thus, on leaving the capstan 11 the cable emerges essentially in its travel direction and passes into the means 20, 30 for displacing said cable transversely.

The capstan 11 is motorized with the aid of a motor 13, via a transmission belt 14, with a rotation speed which produces a linear cable speed designated as V1. Control of the cable speed V1 in synchronism with the surface speed V2 of the receiving surface 2 makes it possible to determine the quantity of cable fed onto the rotating surface 2 per revolution of the latter.

The displacement means 20, 30 are shown more particularly in FIGS. 2 and 3, and comprise a guiding head 20 that co-operates with the means 30 in the body 5.

The guiding head 20 comprises a connecting rod 21 perpendicular to the rotation axis XX' of the capstan, which has on its face 210 facing towards the outside of the application device 1 two guide rollers 22 and 23 whose axes are perpendicular to said connecting rod and which are mounted to rotate freely relative to the latter.

Each guide roller 22, 23 has a central groove 221, 231 to receive the cable delivered by the capstan 11. To facilitate the guiding of the cable and accompany it in its transverse displacement, the two guide rollers 22 and 23 are eccentric relative to the center of the face of the connecting rod 21 such that they are tangential to the line extending in the cable travel direction and passing through the center of the connecting rod, and are offset from one another in that direction. Although this arrangement is advantageous, it is also quite possible to imagine the two rollers arranged with no mutual offset.

Spindles 24 and 25 with mutually parallel axes are mounted to rotate in the ends 211 and 212 of the connecting rod 21 via a ball bearing 26, the axes of the spindles 24 and 25 being perpendicular to said connecting rod 21.

At the openings of the connecting rod 21 emerging on the inside of the connecting rod relative to the application device, these spindles 24 and 25 have, respectively, caps 241, 251.

The displacement means 30 comprise two mutually parallel spindles 31 and 32 which are perpendicular to the axis XX', in other words perpendicular to the cable travel direction, which rotate in ball bearings 33 mounted in the body 5 and are driven by a common motor (not shown) connected respectively to a drive pulley 36, 37 for each spindle by one and the same transmission belt 35.

At the openings of the body 5 facing the guiding head 20, the spindles 31 and 32 are extended respectively by caps 311 and 321, these caps 311, 321 being connected respectively to the caps 221 and 231 by mutually parallel levers 27 and 28, which ensure the transmission of the motorization to the spindles 24 and 25.

The rotation speed of the spindles 31, 32, 24 and 25 will be designated as V3.

As the cable is passing, the rotation of the spindles 31 and 32 makes it possible to alternate the positions of the levers 27 and 28. In effect, the pivoting of the levers 27 and 28 about their axis fixed to the caps 311 and 321 enables the connecting rod 21 to be decentralized relative to the spindles 31 and 32. Thus, viewed in projection on a plane parallel to the connecting rod, the center of the connecting rod 21 describes an ellipse during this rotation.

In addition, the body 5 has on its face parallel to the connecting rod 21 an electromagnet 38 that exerts a restoring force on the rod 21 to compensate the force of gravity.

The means 40 for positioning the cable on the receiving surface 2 comprise a positioning roller 41 that turns freely about its rotation axis Z–Z', whose external revolution surface 410 is in contact with the receiving surface 2 so that the cable passes between said revolution surface and the receiving surface. This positioning roller 41 is located near the two guide rollers 22 and 23 so that it receives the cable coming from those rollers.

An arm 42 carries the positioning roller 41 at one of its ends 420, while the other end 421 of the arm is fixed by means of a support 43 on the body 5, said support being mounted to pivot on an elastic joint 45 on the body 5 to guarantee that the cable is applied onto the rotating surface 2 under some force.

In what follows, the operation of the application device during the production of a period of a cable sinusoid will be described briefly, with reference to FIGS. 3 and 4A to 4D.

As a preamble to this description it should be noted that at a given surface speed V2 of the receiving surface 2, adjustment of the cable feed speed V1 enables the quantity of cable fed in per revolution of the surface 2 to be regulated. Besides, in the absence of the cable, since the spindles 31 and 32 are rotating, the electromagnet 38 holds the connecting rod 21 with a fixed position of the levers 27 and 28 relative to the caps 311 and 321, and when viewed in projection on a plane parallel to the rod, the center of the rod will then describe a circle.

When the cable is present, and for a speed V1=V2, the cable is positioned in a straight line. When the cable feed speed V1 is higher than the surface speed V2 of the rotating surface, the cable acts upon the rod by exerting a thrust which causes the levers 27 and 28 to pivot, and the rotation of the spindles 31 and 32 leads to alternation of the position of the levers then again the thrust of the cable acts. Thus, when V1 is higher than V2, the rotation speed V3 of the spindles enables the alternation of the levers 27 and 28 per revolution of the surface 2 to be determined, and so the period of the undulations formed by the cable on said surface. The amplitude of these undulations is obtained directly by the quantity of cable fed in per revolution of the surface 2, since it is this quantity which, by "pushing" the connecting rod 21, determines the angle of inclination of the levers 27 and 28.

Thus, to achieve easy modification of the undulation amplitude of the cable on the receiving surface 2 so as to obtain amplitudes that vary continuously according to the radial position of the cable, as explained at the beginning of the text, it suffices to modify the quantity of cable fed in per revolution of the surface 2 and hence the speed V1. The amplitude of the undulations will adjust itself automatically, as explained above. The system is thus very simple to adapt to the desired undulation modifications.

It is important to take the nature of the cable into account. In effect, as was said earlier, the cable acts as a thrust element on the connecting rod 21 and must therefore have a certain rigidity that enables it to perform that function. This rigidity is easily obtained when a metallic cable is chosen. In the case of a textile cable it becomes necessary to increase the force of the electromagnet so that the latter will play a greater part and it will be the magnet, and no longer the cable, which brings about a change in the direction of the connecting rod 21 in the transverse direction.

FIGS. 4A to 4D now illustrate the movements of the rod 21 to produce an undulation period P of a cable C with amplitude A.

The symbols X", Y", and Z" denote the trigonometric axes with the center of the positioning roller 41 as the origin, Z" being parallel to the rotation axis of the capstan 11, the trigonometric orientation is taken into account.

In FIG. 4A the levers 27 and 28 have angular position equal to zero, meaning that the spindles 32 and 31 are respectively aligned with the spindles 24 and 25, and the position of the cable at the center of the roller 41 corresponds to the co-ordinate X"=0. This is the beginning of the period.

Figure 4B:
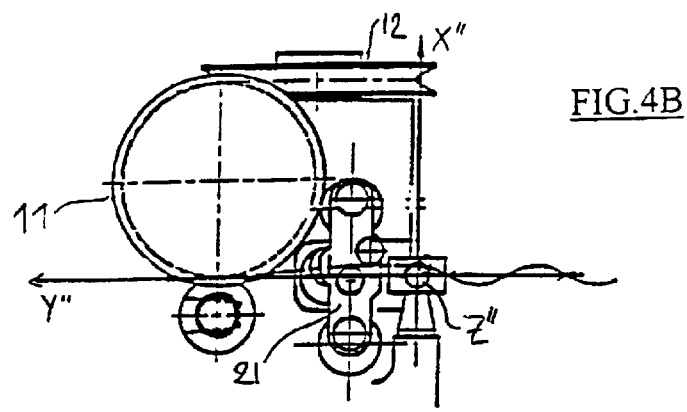
Figure 4C:
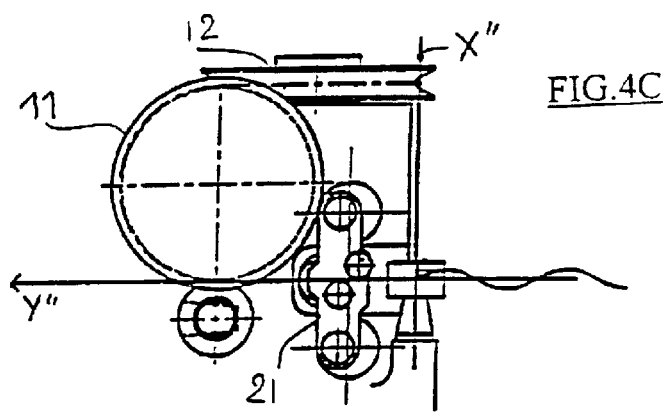

In FIG. 4B the spindles 31 and 32 have turned through 90°, the levers 27 and 28 are therefore in one of the two extreme positions to which the rod 21 can move, and the position of the cable corresponds to X"=A/2.

In FIG. 4C the cable is again in a position X"=0, the spindles 31 and 32 having turned through 180° so that the levers 27 and 28 have returned to their position in which the spindles 31, 32 and 25, 24 are aligned.

Figure 4D:
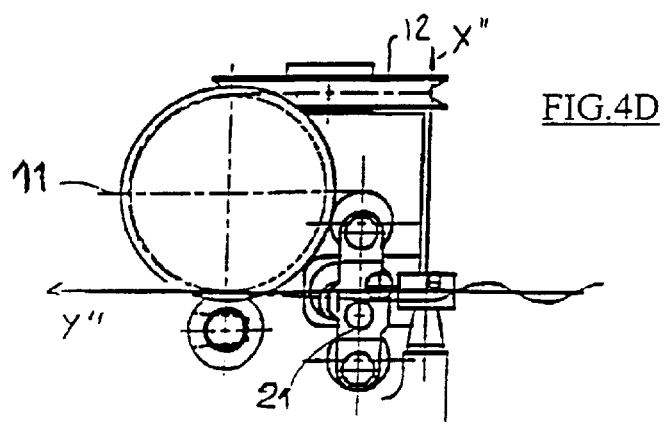

Finally, in FIG. 4D the spindles 31 and 32 have turned through 270° and the levers 27 and 28 are in the second "extreme" position of the rod 21, in other words at the opposite end relative to the axis Y'Y compared with their position shown in FIG. 4B.

These figures clearly illustrate the manner in which the movements of the rod 21 control the undulations of the cable on the surface 2.

What is claimed is:

1. A device for applying at least one cable onto a rotating receiving surface having a linear surface speed V2, comprising:
   a body;
   at least one capstan rotatably mounted on the body to feed the cable in a feed direction at a linear speed V1;
   displacement means for receiving the cable from the capstan and displacing the cable transversely relative to the rotating receiving surface, transverse movement of the displacement means being driven by the cable and being responsive to a magnitude of a difference between V1 and V2,
   positioning means for receiving the cable from the displacement means and positioning the cable on said receiving surface, and,
   control means for controlling a transverse amplitude of the displacement directly by adjusting the speed V1 relative to the speed V2, wherein said amplitude is continuously variable during the positioning of the cable.

2. A device according to claim 1, wherein the displacing means comprises first rotatable spindles disposed perpendicular to the feed direction, supported by the body, and a cable guiding head mounted to pivot on said rotatable spindles, wherein, cable moving at a speed V1 greater than V2 causes the cable guiding head to pivot, and first rotatable spindles cause the pivoted cable guiding bead to reciprocate transversely.

3. A device according to claim 2, wherein the cable guiding bead is connected to the first rotatable spindles by levers, said levers being mounted on the guiding bead via second rotatable spindles whose axes are parallel to those of the first rotatable spindles and which are mounted to rotate within said guiding head.

4. A device according to claim 3, wherein the guiding head comprises a connecting rod that carries the second rotatable spindles.

5. A device according to claim 2, wherein the guiding head has two cable guide rollers mounted to rotate freely on the guiding head, said rollers having respective grooves to receive said cable.

6. A device according to claim 2, further comprising an electromagnet mounted to the body for exerting a restoring force on the guiding head.

7. A device far applying at least one cable onto a rotating receiving surface having a surface linear speed V2, comprising:
   at least one capstan for receiving cable from a cable supply source and feeding the cable in a feed direction at a linear speed V1;
   means for varying the speed V1 relative to the speed V2;
   means for displacing the cable transversely relative to the receiving surface responsive to the speed V1 of the cable relative to the speed V2 of the rotating receiving surface, including rotary movement means baying a rotation axis perpendicular to the cable feed direction and pivoting movement means movable in a plane containing the rotation axis, wherein feeding the cable at a speed V1 greater than V2 causes the pivoting movement means to pivot and rotation of the rotary movement means causes transverse reciprocating movement of the pivoted pivoting movement means, a magnitude of pivoted displacement being determined by the ratio between the speeds V1 and V2, and
   means to position the cable on said receiving surface.

8. A device for applying at least one cable onto a rotating receiving surface having a linear surface speed V2, comprising:

a body;

at least one capstan rotatably mounted on the body to feed the cable in a feed direction at a linear speed V1;

displacement means for receiving the cable from the capstan and displacing the cable transversely relative to the rotating receiving surface responsive to a magnitude of a difference between V1 and V2, comprising first rotatable spindles disposed perpendicular to the feed direction, supported by the body, and a cable guiding head mounted to pivot on said rotatable spindles, wherein, cable moving at a speed V1 greater than V2 causes the cable guiding head to pivot, and first rotatable spindles cause the pivoted cable guiding head to reciprocate transversely;

positioning means for receiving the cable from the displacement means and positioning the cable on said receiving surface, and, control means for controlling a transverse amplitude of the displacement directly by adjusting the speed V1 relative to the speed V2, wherein said amplitude is continuously variable during the positioning of the cable.

* * * * *